United States Patent [19]

Carroll

[11] Patent Number: 5,385,211
[45] Date of Patent: Jan. 31, 1995

[54] ELECTRIC POWER PLANT FOR VEHICLES

[76] Inventor: Robert D. Carroll, P.O. Box 602, Pismo Beach, Calif. 93448

[21] Appl. No.: 60,001

[22] Filed: May 12, 1993

[51] Int. Cl.$^6$ ............................................. B60K 6/00
[52] U.S. Cl. .................................. 180/65.2; 180/65.4; 180/303
[58] Field of Search ............ 180/65.2, 65.4, 303, 180/310; 60/616, 618, 668; 122/3

[56] References Cited

U.S. PATENT DOCUMENTS

| | | | |
|---|---|---|---|
| 3,543,873 | 12/1970 | Toy | 180/65.2 |
| 3,830,326 | 8/1974 | Hartung | 180/303 |
| 4,097,752 | 6/1978 | Wulf et al. | 180/65.2 X |
| 4,405,029 | 9/1983 | Hunt | 180/303 X |
| 4,470,476 | 9/1984 | Hunt | 180/65.2 |
| 4,534,169 | 8/1985 | Hunt | 180/65.2 X |
| 5,147,003 | 9/1992 | De Monclin | 180/65.2 X |

*Primary Examiner*—Kenneth R. Rice
*Assistant Examiner*—Carla Mattix
*Attorney, Agent, or Firm*—Daniel C. McKown

[57] ABSTRACT

The drive wheels of an electric automobile are driven by one or more D.C. drive motors which derive their power from a battery. The battery is charged by two separate D.C. generators. The first D.C. generator is powered by an internal combustion engine, and the second D.C. generator is powered by a steam engine. The steam engine uses waste heat from the internal combustion engine to boil its operating liquid.

1 Claim, 1 Drawing Sheet

ELECTRIC POWER PLANT FOR VEHICLES

BACKGROUND OF THE INVENTION

1. Field of the Invention

The present invention is in the field of vehicular power plants and more specifically relates to a type of power plant in which an internal combustion engine operates a generator that charges a battery pack, while simultaneously, a steam engine using waste heat from the internal combustion engine operates a second generator that also charges the battery pack. There is no mechanical connection between either engine and the drive wheels, the drive wheels being driven by electric motors powered by the battery pack.

2. The Prior Art

In U.S. Pat. No. 4,405,029 issued Sept. 20 1983, Hunt shows a vehicle that has an electric motor as well as an internal combustion engine that may selectively be connected to drive the wheels of the vehicle, either independently or together. At speeds above 20 mph, the internal combustion engine drives the wheels, and heat from the engine is used to generate electric power that is stored in the battery. Below 20 mph, the wheels are driven by an electric motor powered by the battery, although the internal combustion engine may be used to assist. This differs from the present invention in that, in the present invention the battery-powered electric motor always drives the wheels and the gasoline engine never directly drives the wheels but only operates a D.C. generator.

In U.S. Pat. No. 4,470,476 issued Sept. 11, 1984, which is a divisional of the aforementioned U.S. Pat. No. 4,405,029, Hunt shows another embodiment of his invention, in which radiant energy of the waste heat and exhaust gases from the internal combustion engine are converted directly to electrical energy by means of photovoltaic cells which are used to charge the battery. In contrast, the present invention does not use photovoltaic cells.

In U.S. Pat. No. 4,109,743, Brusaglino et al. describe a vehicle propulsion system in which a turbine drives two counter rotating flywheels that in turn drive two D.C. generators. These D.C. generators power electric motors that turn the drive wheels. In this system the energy is stored in the flywheels rather than in a battery pack, and no batteries are used in the system.

In U.S. Pat. No. 4,394,582, Kreissl et al. show a method and apparatus for using the waste heat energy from an internal combustion engine. In their system, a turbine is driven by exhaust gases from the internal combustion engine, and the turbine drives a generator. The generator connected through an electrical converter to an electric motor which is drivingly coupled to the internal combustion engine to help it to overcome its load. The turbine needs to turn very fast (120,000 rpm) and so it is necessary to use a "synchronous" type of rotor. Thus, Kreissl et al. use waste heat as a way of mechanically assisting the internal combustion engine that is connected to the drive wheels of the car.

In U.S. Pat. No. 4,570,077 issued Feb. 11, 1986 to Lambley, there is shown a waste heat recovery system in which the waste heat from the main engine heats a boiler that drives a turbine that is used to drive an alternator. When there is not enough waste heat, a hydraulic drive powered by the main engine is clutched to the alternator rotor shaft to turn it.

In U.S. Pat. No. 4,433,548 issued Feb. 28, 1984 to Hallstrom, Jr. there is described an engine that is a combination internal combustion engine and steam engine, and in which the hot exhaust gases resulting from the power stroke of the internal combustion engine are used to generate steam that is used to provide a second power stroke.

In the latter three patents described above, the wheels of the automobile are driven by an internal combustion engine, while in contrast, in the present invention the wheels are always driven by a D.C. drive motor powered by a battery. The battery, in turn, is charged by a first D.C. generator powered by an internal combustion engine and by a second D.C. generator powered by a steam engine that is heated by waste heat from the internal combustion engine.

SUMMARY OF THE INVENTION

The main objective of the present invention is to provide a vehicle power plant that is highly efficient and at the same time practical for everyday use.

In accordance with a preferred embodiment of the invention, the wheels of the automobile are driven by one or more D.C. motors that are powered by a battery. The battery serves as a buffer between the D.C. drive motors that experience widely varying loads and the D.C. generators that operate at a relatively constant speed. A first D.C. generator is driven by an internal combustion engine, such as a lawn mower engine or possibly a small boat engine. The second D.C. generator is turned by a steam engine that operates from the heat wasted by the internal combustion engine.

The boiler of the steam engine envelops portions of the internal combustion engine to maximize heat transfer to a liquid in the boiler. In operation, the internal combustion engine runs at a substantially constant speed that is chosen to be its most efficient speed. Likewise, the steam engine also operates at a substantially constant speed.

For very short trips, the vehicle can be operated on the battery alone. For longer trips, the internal combustion engine should be activated to avoid excessive draw-down of the battery; however, for these intermediate length trips the boiler may not have time to generate enough steam to operate the steam engine. For long trips and highway driving, the boiler has time to generate the required steam and the steam engine comes into operation. It is noteworthy that after a long trip, the steam engine continues to operate for a few minutes to recharge the battery.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
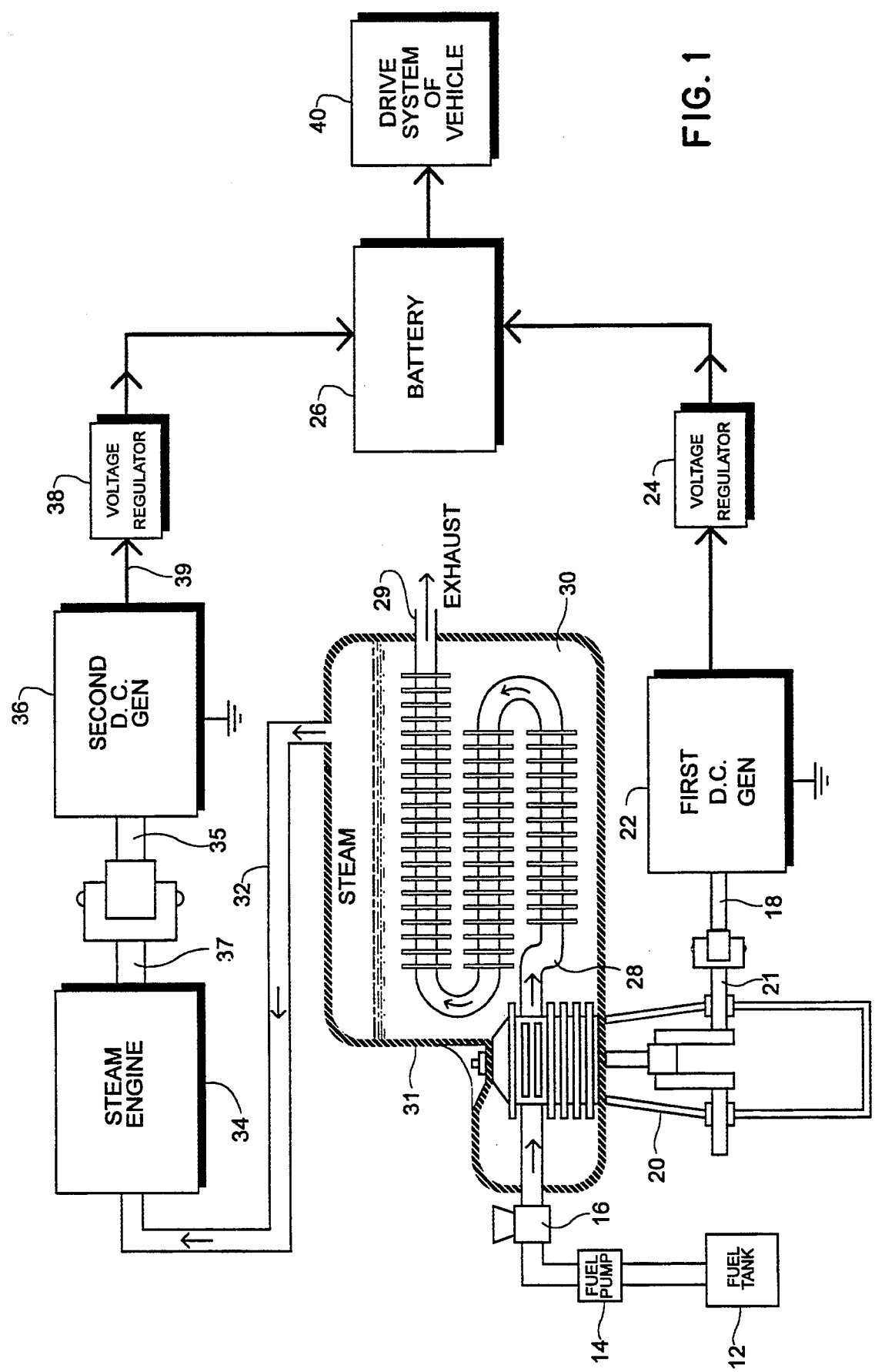
FIG. 1 is a block diagram showing how the various components of the vehicle power plant are related to each other in the preferred embodiment.

In accordance with a preferred embodiment of the present invention, the source of energy for the vehicle power plant is a chemical fuel stored onboard the vehicle in a fuel tank 12. In the preferred embodiment, the fuel is gasoline. A fuel pump 14 conveys the fuel from the fuel tank 12 to a carburetor 16. The fuel pump 14 is electrically-powered in the preferred embodiment, and the engine 20 is provided with an electric starter (not shown).

In the preferred embodiment, the internal combustion engine 20 is rather small, producing less than 50 horsepower. In the present invention, the internal combustion engine operates at a relatively constant speed which is chosen for maximum efficiency. As seen in FIG. 1, the crankshaft 21 of the internal combustion engine is coupled to and turns the armature 18 of a first D.C. generator 22. This generator 22 generates an electric current that is applied through the voltage regulator 24 to the battery 26.

Although the internal combustion engine 20 and its components are conventional, the technique used in the preferred embodiment to extract and to use waste heat from the engine 20 is believed to be novel.

A boiler 30 consisting of a hollow chamber defined by a wall 31 envelops and surrounds the cylinder of the engine 20. The cylinder is normally one of the hotter parts of a piston-type engine and in accordance with the present invention, a hot part of the engine 20 is in contact with the liquid in the boiler, so as to heat the liquid.

Further heating of the liquid is accomplished by the exhaust conduit 28 of the engine, which extends through the space within the boiler and which is provided with fins to promote transfer of heat from the exhaust conduit to the liquid in the boiler. The exhaust fumes are vented into the atmosphere through the exhaust port 29. In the preferred embodiment, the liquid is water, but in other embodiments other liquids, including fluorinated hydrocarbons, are used.

Upon being heated sufficiently, the liquid in the boiler 30 boils, producing steam under pressure. The pressurized steam is applied through the insulated duct 32 to a steam engine 34. The steam engine 34 is a turbine in the preferred embodiment, but in an alternative embodiment a piston-type steam engine is used. The shaft 37 of the steam engine 34 is coupled to and turns the armature 35 of a second D.C. generator 36, which generates a direct current that is applied on the conductor 39 through the voltage regulator 38 to the battery 26.

In the preferred embodiment, the spent steam from the steam engine is vented to the atmosphere. In an alternative embodiment, the spent steam is condensed and pumped back into the boiler to conserve water. Both of these expedients are well-known.

Thus, either the internal combustion engine 20 or the steam engine 34, or both, acting through, respectively, the first D.C. generator 22 or the second D.C. generator 36, may supply an electrical current for charging the battery 26. That is, the whole purpose of the engines and generators is to charge the battery 26. The charged battery 26 may then be used for supplying energy to a drive system 40 for a vehicle. The drive system is beyond the scope of the present invention, but typically includes electric motors and control means.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. An electric power plant for a type of vehicle in which a drive wheel is driven by an electric motor that draws power from a battery, the electric power plant comprising:

a battery;

a first D.C. generator electrically connected to the battery for charging the battery;

a second D.C. generator electrically connected to the battery for charging the battery;

an internal combustion engine mechanically connected to said first D.C. generator for turning said first D.C. generator, said internal combustion engine including a cylinder;

a steam engine mechanically connected to said second D.C. generator for turning said second D.C. generator;

said steam engine including a boiler that envelops and surrounds the cylinder of said internal combustion engine, said boiler heated by waste heat from said internal combustion engine.

* * * * *